(12) United States Patent
Prieto et al.

(10) Patent No.: US 7,873,517 B2
(45) Date of Patent: Jan. 18, 2011

(54) MOTOR VEHICLE WITH A SPEECH INTERFACE

(75) Inventors: Ramon Prieto, Mountain View, CA (US); M. Kashif Imam, Palo Alto, CA (US); Carsten Bergmann, San Jose, CA (US); Wai Yin Cheung, San Mateo, CA (US); Carly Williams, Mountain View, CA (US)

(73) Assignee: Volkswagen of America, Inc., Auburn Hills, MI (US)

( * ) Notice: Subject to any disclaimer, the term of this patent is extended or adjusted under 35 U.S.C. 154(b) by 851 days.

(21) Appl. No.: 11/595,113

(22) Filed: Nov. 9, 2006

(65) Prior Publication Data

US 2008/0114598 A1    May 15, 2008

(51) Int. Cl.
| | |
|---|---|
| G10L 15/28 | (2006.01) |
| G10L 15/22 | (2006.01) |
| G10L 15/26 | (2006.01) |
| G10L 13/06 | (2006.01) |
| G10L 21/00 | (2006.01) |
| G10L 15/18 | (2006.01) |
| G06F 17/20 | (2006.01) |

(52) U.S. Cl. .................. 704/255; 704/8; 704/257; 704/266; 704/275

(58) Field of Classification Search ............ None
See application file for complete search history.

(56) References Cited

U.S. PATENT DOCUMENTS 6,085,160 A * 7/2000 D'hoore et al. .......... 704/256.2
6,243,675 B1 * 6/2001 Ito ........................... 704/232
6,272,464 B1 * 8/2001 Kiraz et al. ................ 704/257

(Continued)

FOREIGN PATENT DOCUMENTS

DE    10 2004 055 609 A1    8/2005

(Continued)

OTHER PUBLICATIONS

Niesler, T.R; Willett, D; Language identification and multilingual speech recognition using discriminatively trained acoustic models. ISCA Tutorial and Research Workshop (ITRW) on Multilingual Speech and Language Processing (MULTILING-2006), Apr. 9-11, Stellenbosch, South Africa; see Figs.1-4 and chapters 1, 2.

(Continued)

*Primary Examiner*—Matthew J Sked
(74) *Attorney, Agent, or Firm*—Manfred Beck, P.A.

(57) ABSTRACT

A motor vehicle has a speech interface for an acoustic input of commands for operating the motor vehicle or a module of the motor vehicle. The speech interface includes a speech recognition database in which a substantial portion of commands or command components, which can be input, are stored in a version according to a pronunciation in a first language and in a version according to a pronunciation in at least a second language, and a speech recognition engine for automatically comparing an acoustic command to commands and/or command components, which are stored in the speech recognition database, in a version according to the pronunciation in the first language and to commands and/or command components, which are stored in the speech recognition database, in a version according to the pronunciation in the second language.

19 Claims, 3 Drawing Sheets

24

SPEECH RECOGNITION DATABASE

| ... | ... |
|---|---|
| Miranda_ave_english | #m$.'R+@n.d$ '@.v$.nu# |
| Miranda_ave_spanish | #mi.'R+an.da`a.'Be.nwe# |
| ... | ... |

U.S. PATENT DOCUMENTS

| | | | |
|---|---|---|---|
| 7,149,688 B2 * | 12/2006 | Schalkwyk | 704/255 |
| 7,181,395 B1 * | 2/2007 | Deligne et al. | 704/249 |
| 7,277,846 B2 * | 10/2007 | Satoh | 704/3 |
| 7,292,980 B1 * | 11/2007 | August et al. | 704/254 |
| 7,328,155 B2 * | 2/2008 | Endo et al. | 704/251 |
| 7,415,411 B2 * | 8/2008 | Reinhard et al. | 704/257 |
| 7,457,755 B2 * | 11/2008 | Konig | 704/275 |
| 2002/0095282 A1 * | 7/2002 | Goronzy et al. | 704/10 |
| 2005/0033575 A1 | 2/2005 | Schneider | |
| 2005/0197842 A1 | 9/2005 | Bergmann et al. | |
| 2005/0273337 A1 * | 12/2005 | Erell et al. | 704/260 |
| 2006/0100871 A1 * | 5/2006 | Choi et al. | 704/254 |
| 2007/0005206 A1 * | 1/2007 | Zhang et al. | 701/36 |

FOREIGN PATENT DOCUMENTS

| | | |
|---|---|---|
| DE | 10 2004 061 782 A1 | 9/2005 |
| EP | 0953896 A1 | 11/1999 |
| EP | 1693828 A1 | 8/2006 |
| WO | WO 01/28187 A1 | 4/2001 |
| WO | 0231814 A1 | 4/2002 |
| WO | 0250817 A1 | 6/2002 |
| WO | 03060877 A1 | 7/2003 |

OTHER PUBLICATIONS

Search Report issued by the German Patent Trademark Office, dated May 7, 2008.

Niklas Torstenson "Grapheme-to-phonene conversion, a knowledge-based approach" Dept. of Languages, Högskolan i Skövde, TMH-QPRS vol. 44—Fonetik 2002.

* cited by examiner

SPEECH RECOGNITION DATABASE 24

| ... | ... |
|---|---|
| Miranda_ave_english | #m$.'R+@n.d$ '@.v$.nu# |
| Miranda_ave_spanish | #mi.'R+an.da`a.'Be.nwe# |
| ... | ... |

FIG. 5

SPEECH OUTPUT DATABASE 37

| ... | ... |
|---|---|
| thanks | #'T@nKkɜ# |
| gracias | #gɾa.sjas# |
| ... | ... |

FIG. 6

MOTOR VEHICLE WITH A SPEECH INTERFACE

BACKGROUND OF THE INVENTION

Field of the Invention

The invention relates to a motor vehicle with a speech interface for an acoustic output of information and/or for an acoustic input of commands for operating the motor vehicle or a module of the motor vehicle.

International Publication No. WO 01/28187 A1 discloses a system which is implemented in a vehicle and which is operated by acoustic inputs. Acoustic inputs in the context of motor vehicles are furthermore disclosed in German Patent Application Publication Nos. DE 10 2004 055 609 A1 and DE 10 2004 061 782 A1.

SUMMARY OF THE INVENTION

It is accordingly an object of the invention to provide a motor vehicle with a speech interface which overcomes disadvantages of the heretofore-known motor vehicles of this general type and which improves the operation of the motor vehicle and makes the operation of the motor vehicle easier and more convenient.

With the foregoing and other objects in view there is provided, in accordance with the invention, a motor vehicle including:

a speech interface configured to receive an acoustic input of commands for operating a motor vehicle or a module of the motor vehicle;

the speech interface including a speech recognition database and a speech recognition engine;

the speech recognition database storing a substantial portion of commands and/or command components which can be input, in a version according to a pronunciation in a first language and in a version according to a pronunciation in at least a second language; and the speech recognition engine being configured to automatically compare an acoustic command to commands and/or command components, which are stored in the speech recognition database, in a version according to the pronunciation in the first language and to commands and/or command components, which are stored in the speech recognition database, in a version according to the pronunciation in the second language.

In other words, according to the invention, there is provided a motor vehicle with a speech interface for an acoustic input of commands for operating the motor vehicle or a module of the motor vehicle, wherein the speech interface includes a speech recognition database in which a substantial portion of commands or command components, which can be input, are stored in a version according to a pronunciation in a first language and in a version according to a pronunciation in at least a second language, and a speech recognition engine for automatically comparing an acoustic command to commands and/or command components, which are stored in the speech recognition database, in a version according to the pronunciation in the first language and to commands and/or command components, which are stored in the speech recognition database, in a version according to the pronunciation in the second language.

A speech recognition database in accordance with the invention may also be set up in a modular manner separated according to languages. A speech recognition database that is set up in a modular manner separated according to languages is in particular then a speech recognition database in accordance with the invention if the speech recognition database interacts in accordance with the invention with a speech recognition engine such that the speech recognition engine automatically compares an acoustically input command to the commands and/or command components, which are stored in the speech recognition database, in the version according to the pronunciation in the first language as well as to the commands and/or command components, which are stored in the speech recognition database, in the version according to the pronunciation in the second language.

According to another feature of the invention, the speech interface includes a speech recognition acoustic model trained in the first language and in the second language.

According to yet another feature of the invention, the speech interface includes a first grapheme-to-phoneme module assigned to the first language, the first grapheme-to-phoneme module is configured to generate a new entry in the speech recognition database for a new word and/or a new name.

According to another feature of the invention, the speech interface further includes a second grapheme-to-phoneme module assigned to the second language, the second grapheme-to-phoneme module is configured to generate a new entry in the speech recognition database for the new word and/or the new name.

According to a further feature of the invention, the speech interface includes a multilingual grammar module, the multilingual grammar module includes grammar and phrases in the first language and in the second language.

According to another feature of the invention, the speech interface includes a speech output interface configured to provide an acoustic output of information.

According to a further feature of the invention, the speech output interface includes a language selection module configured to automatically select the first language or the second language for an output of information.

According to yet another feature of the invention, the language selection module includes a counter configured to count words and/or components of a command having been input, distinguished according to a use of the first language and the second language for individual words and components.

According to another feature of the invention, the language selection module includes a language switch configured to automatically select the first language or the second language for the output of the information in dependence of a number of words and/or components of the command having been input in the first language and the second language within a counting interval.

According to another feature of the invention, the language selection module includes a counter configured to count words and/or components of a command having been input, distinguished according to a use of the first language and the second language for individual words and components within a counting interval.

According to another feature of the invention, the speech output interface includes a text-to-speech module trained with the first language and the second language for transforming a text command into a speech output.

According to another feature of the invention, the speech output interface includes a speech output database storing a substantial portion of information which can be output, in a version according to a pronunciation in the first language and in a version according to a pronunciation in the second language.

As defined above, in accordance with an embodiment of the invention, the speech interface further includes a speech recognition acoustic model trained at least in the first language as well as in the second language.

In accordance with a further embodiment of the invention, the speech interface includes a first grapheme-to-phoneme module assigned to the first language for generating a new entry in the speech recognition database for a new word or a new name (in the first language) as well as, in accordance with a further embodiment of the invention, a second grapheme-to-phoneme module assigned to the second language for generating a new entry in the speech recognition database for the new word or the new name (in the second language). Details relating to the grapheme-to-phoneme process are for example disclosed in the sources cited in German Patent Application Publication Nos. DE 10 2004 055 609 A1 and DE 10 2004 061 782 A1, such as the article with the title "Grapheme-to-phoneme conversion, a knowledge-based approach" by Niklas Torstenson, Dept. of Languages, Högskolan i Skövde, TMH-QPRS Vol. 44—Fonetik 2002, available at the web address www.speech.kth.se/qprs/tmh/2002/02-44-117-120.pdf.

In a further embodiment of the invention, the speech interface further includes a speech output interface for an acoustic output of information, wherein, in accordance with a further embodiment of the invention, the speech output interface includes a language selection module for an automatic selection of the first language or the second language for an output of information. In accordance with a further embodiment of the invention, the language selection module includes a counter for counting words or components of a command having been input, distinguished according to a use of the first and the second language for individual words or components of a command that has been input (in particular within a counting interval) and, in accordance with another embodiment of the invention, a language switch for an automatic selection of the first or second language for an output of the information in dependence of a number of words or components of the command, which has been input, in the first and the second language within the counting interval. A counting interval according to the invention may for example be a given number of words or word groups.

In a further embodiment of the invention, the speech output interface includes a text-to-speech module trained by means of the first language and the second language for transforming a text command into a speech output.

In another embodiment of the invention, the speech output interface includes a speech output database in which an essential part of the information which can be output is stored in a version according to the pronunciation in the first language and in a version according to the pronunciation in the second language.

With the foregoing and other objects in view there is provided, in accordance with the invention, a motor vehicle including:

a speech input interface configured to receive an acoustic input of commands for operating a motor vehicle and/or a module of the motor vehicle; and the speech input interface including a speech identification module configured to assign a pronunciation of a command and/or a command component to a language.

In other words, the above-stated object of the invention is furthermore achieved by a motor vehicle, which in particular includes one or more of the above-described features, with a speech input interface for an acoustic input of commands for operating the motor vehicle or a module of the motor vehicle, wherein the speech input interface includes a speech identification module for assigning or allocating the pronunciation of a command that has been input and/or a command component to a language. The motor vehicle may furthermore include a speech output interface for an acoustic output of information as well as, in accordance with a further embodiment of the invention, a language selection module for an automatic selection of the aforementioned language as a language, in which the output of information is performed.

According to another feature of the invention, the motor vehicle includes a speech output interface which is operatively connected to the speech input interface and configured to provide an acoustic output of information.

According to another feature of the invention, the speech output interface includes a language selection module configured to automatically select the proper language as a language to be used for the acoustic output of information.

With the foregoing and other objects in view there is provided, in accordance with the invention, a motor vehicle including a speech interface configured to provide an acoustic output of information; and the speech interface including a language selection module configured to automatically select a language for the output of information.

In other words, the above-stated object of the invention is furthermore achieved by a motor vehicle, which in particular includes one or more of the above-described features, with a speech interface for an acoustic output of information wherein the speech interface includes a language selection module for an automatic selection of the language, in which the output of information is performed.

According to another feature of the invention, the language selection module includes a counter configured to count words and/or components of a command having been input, distinguished according to a language used for individual words and/or components.

According to a further feature of the invention, the language selection module includes a language switch configured to automatically select a language for the output of information in dependence of a respective number of words and/or components of a command having been input in a respective language within a counting interval.

According to another feature of the invention, the language selection module includes a counter configured to count words and/or command components having been input, distinguished according to a language used for individual words and/or components within a counting interval.

According to yet another feature of the invention, the speech interface includes a multilingual text-to-speech module configured to transform a text command into a speech output.

According to another feature of the invention, the speech interface includes a multilingual speech output database.

As explained above, in a further embodiment of the invention, the language selection module includes a counter for counting words or components of a command having been input, distinguished according to a language used for individual words and/or components (in particular within a counting interval) and, in a further embodiment of the invention, a language switch for an automatic selection of the language in which the output of information occurs, in dependence of the number of a language used for words or components of a command having been input within a counting interval. In a further embodiment of the invention, the speech interface includes a text-to-speech module, which is trained as a multilingual text-to-speech module, for a transformation of a text command into a speech output.

A motor vehicle in accordance with the invention is in particular a land vehicle which is operated individually in road traffic. Motor vehicles for the purpose of the invention are in particular not limited to land vehicles having a combustion engine.

Other features which are considered as characteristic for the invention are set forth in the appended claims.

Although the invention is illustrated and described herein as embodied in a motor vehicle having a speech interface, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5 is a schematic illustration of an exemplary embodiment of a speech recognition database in accordance with the invention; and FIG. 6 is a schematic illustration of an exemplary embodiment of a speech output database in accordance with the invention.

DESCRIPTION OF THE PREFERRED EMBODIMENTS

Figure 1:
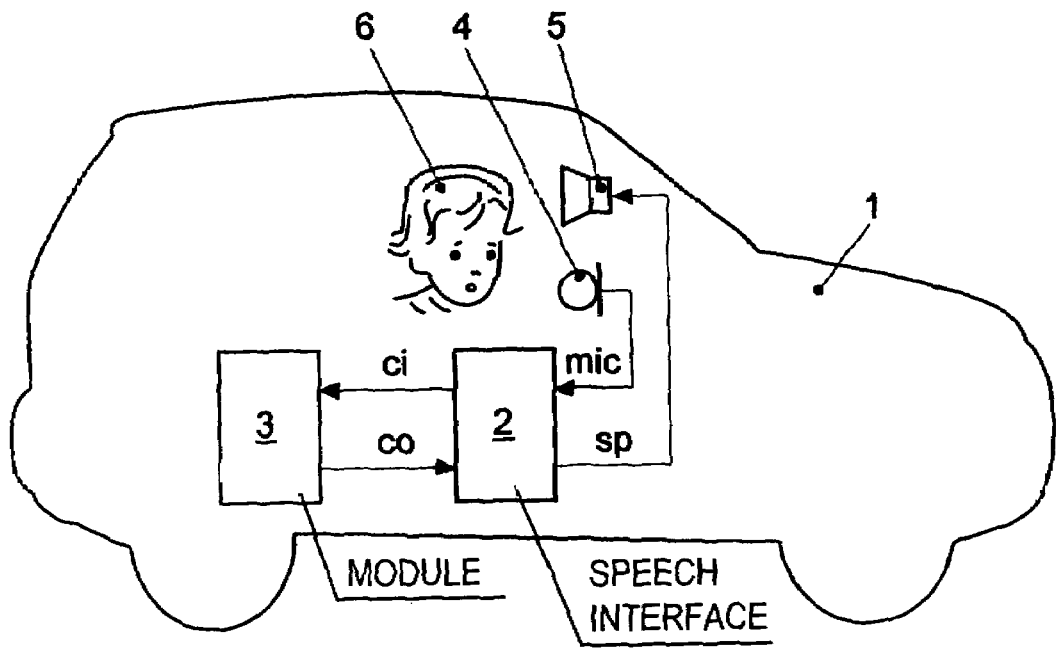
FIG. 1 is a schematic view of an exemplary embodiment of a motor vehicle having a speech interface for an acoustic input of commands for operating the motor vehicle or a module of the motor vehicle as well as for an acoustic output of information in accordance with the invention.
Figure 2:
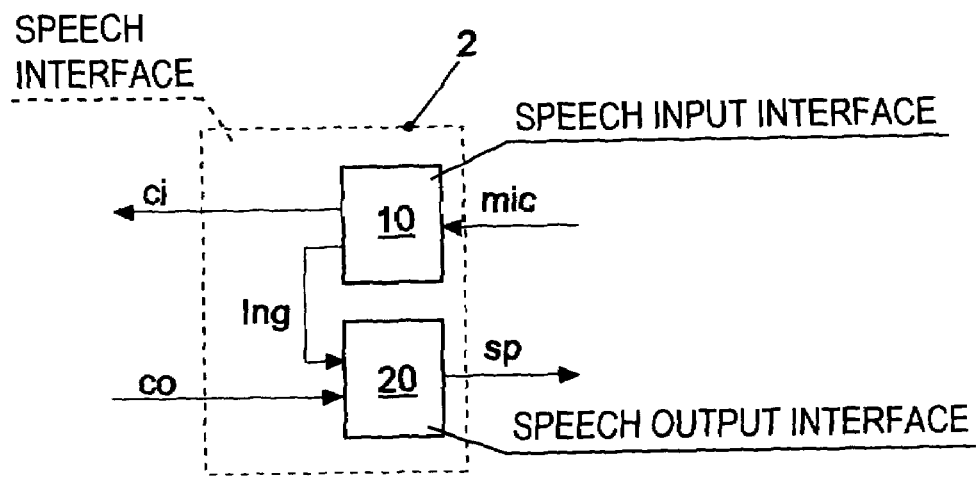
FIG. 2 is a schematic view of an exemplary embodiment of a speech interface according to FIG. 1 in accordance with the invention.

Referring now to the figures of the drawings in detail and first, particularly, to FIG. 1 thereof, there is shown an exemplary embodiment of a motor vehicle 1 with a speech interface 2 which is illustrated in detail in FIG. 2. In combination with a microphone 4, the speech interface 2 makes it possible for an operator 6 to provide an acoustic input of commands for operating the motor vehicle 1 or a module 3 of the motor vehicle 1, such as a navigation system. Furthermore, in combination with a loudspeaker 5, it is possible to provide an acoustic output of information via the speech interface 2. The reference sign mic denotes an output signal of the microphone 4. The reference sign ci denotes an input command which is a translation of the output signal mic of the microphone 4 that can be processed by the motor vehicle 1 or the module 3 of the motor vehicle 1. Reference sign co denotes output information of the motor vehicle 1 or the module 3 of the motor vehicle 1. Reference sign sp denotes an input signal, which corresponds to the output information co, for the loudspeaker 5 for an acoustic output of the output information co such that it can be understood by the operator 6.

Figure 3:
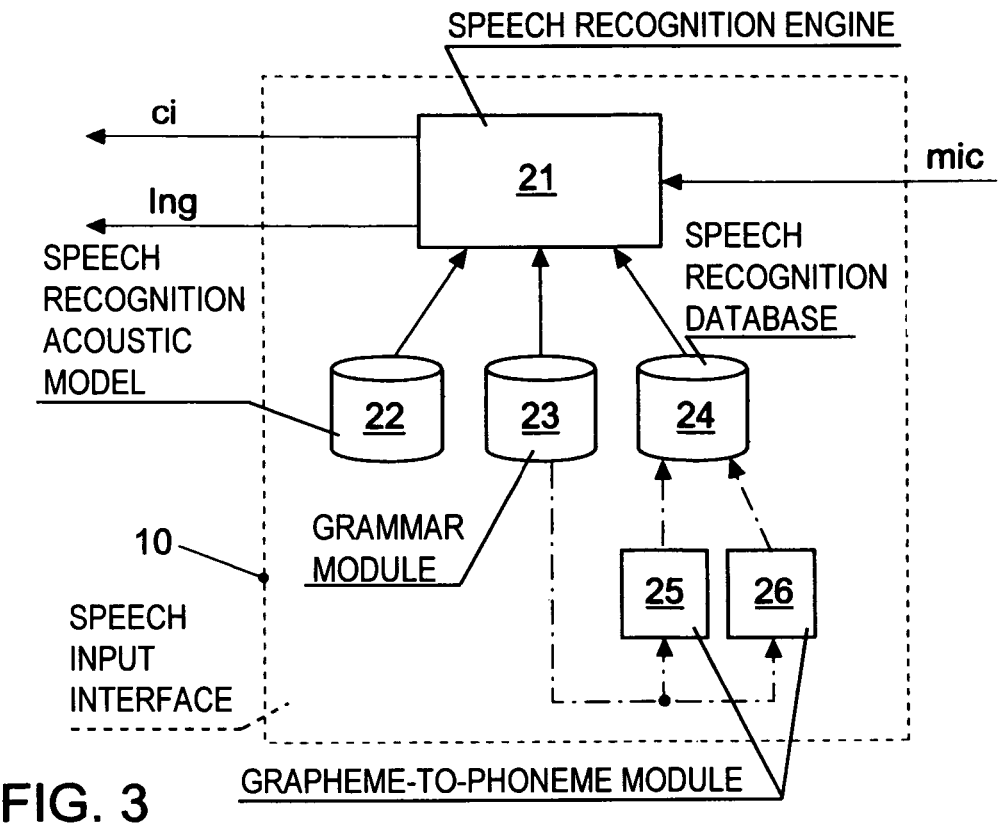
FIG. 3 is a schematic view of an exemplary embodiment of a speech input interface in accordance with the invention.
Figure 4:
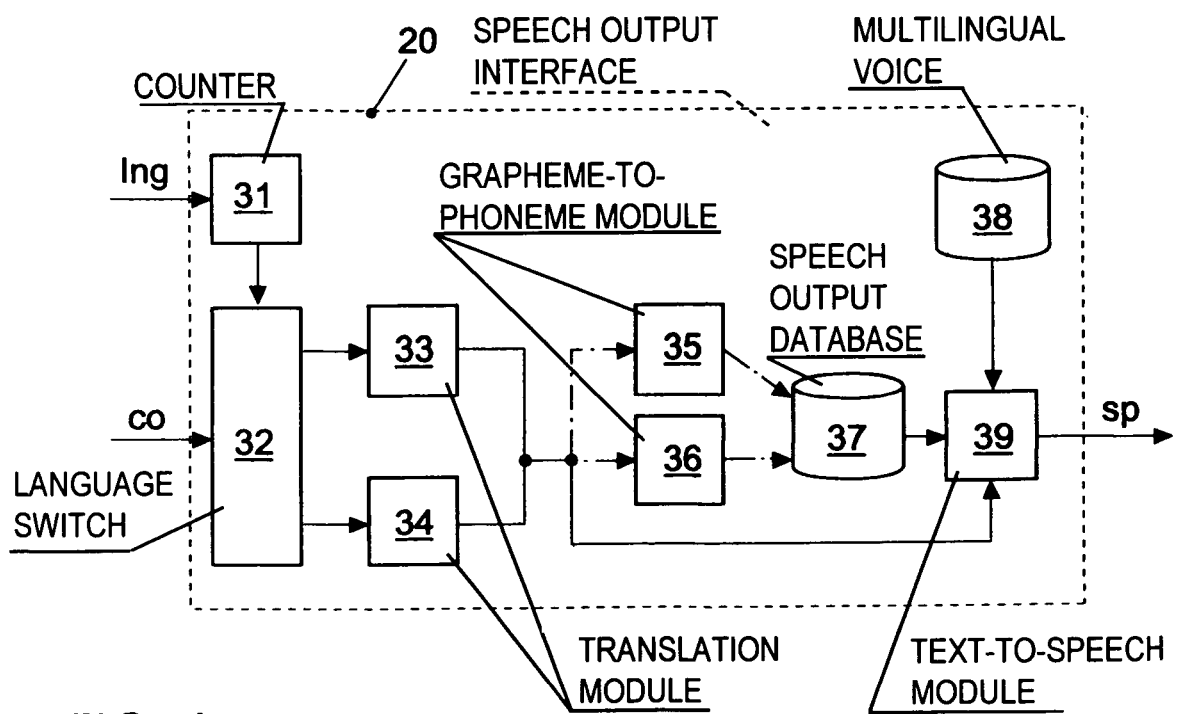
FIG. 4 is a schematic view of an exemplary embodiment of a speech output interface in accordance with the invention.

The speech interface 2 includes a speech input interface 10, which is illustrated in detail in FIG. 3, and a speech output interface 20, which is illustrated in detail in FIG. 4. The speech input interface 10 includes a speech recognition database 24 in which a substantial portion of the commands or command components, which can be input, are stored in a version according to the pronunciation in a first language and in a version according to the pronunciation in at least a second language. A detail or fragment of the speech recognition database 24 is illustrated in an exemplary manner in FIG. 5. In the part of the speech recognition database 24 that is shown in FIG. 5, the name of the location "Miranda Avenue" is stored in an English and in a Spanish pronunciation.

The speech input interface 10 includes furthermore a speech recognition engine 21 for automatically comparing an acoustic command in the form of an output signal mic of the microphone 4 to the commands and/or command components, which are stored in the speech recognition database, in the version according to the pronunciation in the first language as well as to the commands and/or command components, which are stored in the speech recognition database, in the version according to the pronunciation in the second language. For this purpose, speech components in the output signal mic of the microphone 4 are identified by a speech recognition acoustic model 22, which is trained in the first language as well as in the second language, wherein the speech components are divided or organized into (phonetic) command components (e.g. individual words or groups of words, such as for example "the destination is" or "Miranda Avenue") by a multilingual grammar module 23, which includes grammar and phrases of the first language and of the second language.

The (phonetic) command components are compared to the entries of the speech recognition database 24 which means with respect to FIG. 5 that they are compared to the entries in the right column. If there is for example a match with the entry of the second row in the right column, then the speech recognition engine 21 determines that the street name "Miranda Avenue" has been input by the operator 6 in an English pronunciation. The speech recognition engine 21 provides in this case "Miranda Avenue" as the output information co as well as "English" as the output information lng which indicates the language in which a command component has been input. The speech recognition engine 21 in combination with the speech recognition database 24 forms in this case an exemplary embodiment of a speech identification module as defined in the claims.

The speech input interface 10 furthermore includes a grapheme-to-phoneme module 25, which is assigned to the first language, for generating a new entry in the speech recognition data base 24 for a new word or a new name in the first language as well as a grapheme-to-phoneme module 26, which is assigned to the second language, for generating a new entry in the speech recognition data base 24 for the new word or the new name in the second language. Details relating to the grapheme-to-phoneme process are for example disclosed in the sources cited in German Patent Application Publication Nos. DE 10 2004 055 609 A1 and DE 10 2004 061 782 A1, such as the article with the title "Grapheme-to-phoneme conversion, a knowledge-based approach" by Niklas Torstenson, Dept. of Languages, Högskolan i Skövde, TMH-QPRS Vol. 44-Fonetik 2002, available at the web address www.speech.kth.se/qprs/tmh/2002/0244-117-120.pdf.

The speech output interface 20 includes a counter 31 for counting words or components of an command, which has been input, distinguished according to a use of the first and second language for individual words or components of a command, which has been input, within a counting interval. The speech output interface 20 includes furthermore a language switch 32, which is controlled by the counter 31, for an automatic selection of the first or the second language for outputting the information in dependence of the number of words or components of the command, which has been input, in the first and the second language within the counting interval. When, for example, the majority of the words or components of the command, which has been input, or of several commands within the counting interval are pronounced in Spanish, then a setting is performed by the language switch 32 such that a confirmation or answer is given in Spanish. The counter 31 and the language switch 32 form an exemplary embodiment of a language selection module as defined in the claims.

If, for example, the operator 6 gives the instruction "Dial cuatro siete seis dos ocho cinco siete," then the speech input interface 10 provides "Dial the telephone number 4762857" as the input command ci and provides "English Spanish Spanish Spanish Spanish Spanish Spanish Spanish" as the output information lng. The counter 31 determines once "English" and seven times "Spanish" and controls the language switch 32 such that an input confirmation is output in Spanish.

The speech output interface 20 includes translation modules 33 and, respectively 34, which are provided downstream of the language switch 32, for translating the output information co into the first and, respectively, second language. If the content of the output information co reads "input confirmation," then, in accordance with an exemplary embodiment, this output information is converted or translated by the translation module 33 into "thanks" or by the translation module 34 into "gracias." The corresponding translation for the case when the confirmation is performed in Spanish, namely "gracias," is a text command and is transformed through the use of a text-to-speech module 39, trained by means of the first and the second language, for a speech output into an input signal sp for the loudspeaker 5. A speech output database 37 and a multilingual voice 38 are provided for this purpose. The speech output database 37, a detail of which is shown in an exemplary manner in FIG. 6, has at least a substantial part of the information, which can be provided as an output, stored therein in a version according to the pronunciation in the first language and in a version according to the pronunciation in the second language.

In order to supplement the speech output database 37 with new entries, a grapheme-to-phoneme module 35, which is assigned to the first language, and grapheme-to-phoneme module 36, which is assigned to the second language, are provided.

Although, for reasons of clarity, the invention has been described only in conjunction with two languages, the invention is not intended to be limited to a bilingual system. Rather, the invention is to be used in particular with more than two languages.

LIST OF REFERENCE NUMERALS 1 motor vehicle
2 speech interface
3 module of a motor vehicle
4 microphone
5 loudspeaker
6 operator
10 speech input interface
20 speech output interface
21 speech recognition engine
22 speech recognition acoustic model
23 grammar module
24 speech recognition database
25, 26, 35, 36 grapheme-to-phoneme module
31 counter
32 language switch
33, 34 translation module
37 speech output database
38 multilingual voice
39 text-to-speech module
ci input command
co output information
lng output information indicating the language in which a command component has been entered
mic output signal of a microphone
sp input signal for a loudspeaker

What is claimed is:

1. A motor vehicle comprising:
a speech interface configured to receive an acoustic input of commands for operating one of a motor vehicle and a module of the motor vehicle;
said speech interface including a speech recognition database and a speech recognition engine;
said speech recognition database storing a substantial portion of at least one of commands and command components which can be input, in a version according to a pronunciation in a first language and in a version according to a pronunciation in at least a second language, such that each given one of the substantial portion of the at least one of commands and command components is stored in a version according to a pronunciation in the first language and in a version according to a pronunciation in at least the second language;
said speech recognition engine being configured to automatically compare an acoustic command to at least one of commands and command components, which are stored in said speech recognition database, in a version according to the pronunciation in the first language and to at least one of commands and command components, which are stored in said speech recognition database, in a version according to the pronunciation in the second language;
said speech interface including a speech recognition acoustic model trained in the first language and in the second language; and
said speech interface including a multilingual grammar module, said multilingual grammar module including grammar and phrases in the first language and in the second language.

2. The motor vehicle according to claim 1, wherein said speech interface includes a grapheme-to-phoneme module assigned to the first language, said grapheme-to-phoneme module is configured to generate a new entry in said speech recognition database for at least one of a new word and a new name.

3. The motor vehicle according to claim 2, wherein:
said grapheme-to-phoneme module assigned to the first language is a first grapheme-to-phoneme module; and
said speech interface further includes a second grapheme-to-phoneme module assigned to the second language, said second grapheme-to-phoneme module is configured to generate a new entry in said speech recognition database for at least one of the new word and the new name.

4. The motor vehicle according to claim 1, wherein said speech interface includes a speech output interface configured to provide an acoustic output of information.

5. The motor vehicle according to claim 4, wherein said speech output interface includes a language selection module configured to automatically select one of the first language and the second language for an output of information.

6. The motor vehicle according to claim 5, wherein said language selection module includes a counter configured to count at least one of words and components of a command having been input, distinguished according to a use of the first language and the second language for individual words and components.

7. The motor vehicle according to claim 6, wherein said language selection module includes a language switch configured to automatically select one of the first language and the second language for the output of the information in dependence of a number of at least one of words and components of the command having been input in the first language and the second language within a counting interval.

8. The motor vehicle according to claim 5, wherein said language selection module includes a counter configured to count at least one of words and components of a command having been input, distinguished according to a use of the first language and the second language for individual words and components within a counting interval.

9. The motor vehicle according to claim 4, wherein said speech output interface includes a text-to-speech module trained with the first language and the second language for transforming a text command into a speech output.

10. The motor vehicle according to claim 4, wherein said speech output interface includes a speech output database storing a substantial portion of information which can be output, in a version according to a pronunciation in the first language and in a version according to a pronunciation in the second language.

11. A motor vehicle comprising:
a speech interface including a speech input interface configured to receive an acoustic input of commands for operating one of a motor vehicle and a module of the motor vehicle;
said speech input interface including a speech identification module with a speech recognition database storing a substantial portion of at least one of commands and command components which can be input, in a version according to a pronunciation in a first language and in a version according to a pronunciation in at least a second language, such that each given one of the substantial portion of the at least one of commands and command components is stored in a version according to a pronunciation in the first language and in a version according to a pronunciation in at least the second language;
said speech identification module being configured to assign a pronunciation of at least one of a command and a command component to one of the first language and the at least second language;
said speech interface including a speech recognition acoustic model trained in the first language and in the second language; and
said speech interface including a multilingual grammar module, said multilingual grammar module including grammar and phrases in the first language and in the second language.

12. The motor vehicle according to claim 11, including a speech output interface operatively connected to said speech input interface and configured to provide an acoustic output of information.

13. The motor vehicle according to claim 12, wherein said speech output interface includes a language selection module configured to automatically select the language as a language to be used for the acoustic output of information.

14. A motor vehicle comprising:
a speech interface configured to provide an acoustic output of information;
said speech input interface including a speech identification module with a speech recognition database storing a substantial portion of at least one of commands and command components which can be input, in a version according to a pronunciation in a first language and in a version according to a pronunciation in at least a second language, such that each given one of the substantial portion of the at least one of commands and command components is stored in a version according to a pronunciation in the first language and in a version according to a pronunciation in at least the second language;
said speech interface including a language selection module configured to automatically select one of the first language and the at least second language for the output of information;
said speech interface including a speech recognition acoustic model trained in the first language and in the second language; and
said speech interface including a multilingual grammar module, said multilingual grammar module including grammar and phrases in the first language and in the second language.

15. The motor vehicle according to claim 14, wherein said language selection module includes a counter configured to count at least one of words and components of a command having been input, distinguished according to a language used for at least one of individual words and components.

16. The motor vehicle according to claim 15, wherein said language selection module includes a language switch configured to automatically select a language for the output of information in dependence of a respective number of at least one of words and components of a command having been input in a respective language within a counting interval.

17. The motor vehicle according to claim 14, wherein said language selection module includes a counter configured to count at least one of words and command components having been input, distinguished according to a language used for at least one of individual words and components within a counting interval.

18. The motor vehicle according to claim 14, wherein said speech interface includes a multilingual text-to-speech module configured to transform a text command into a speech output.

19. The motor vehicle according to claim 14, wherein said speech interface includes a multilingual speech output database.

* * * * *